(12) United States Patent
Alvarez, III

(10) Patent No.: US 9,590,681 B2
(45) Date of Patent: Mar. 7, 2017

(54) CELLULAR PHONE MOUNTING ASSEMBLY

(71) Applicant: Frank Alvarez, III, Rosemead, CA (US)

(72) Inventor: Frank Alvarez, III, Rosemead, CA (US)

( * ) Notice: Subject to any disclaimer, the term of this patent is extended or adjusted under 35 U.S.C. 154(b) by 0 days.

(21) Appl. No.: 14/732,061

(22) Filed: Jun. 5, 2015

(65) Prior Publication Data

US 2016/0359513 A1    Dec. 8, 2016

(51) Int. Cl.
*H04B 1/38* (2015.01)
*H04B 1/3877* (2015.01)
*H04B 1/3888* (2015.01)

(52) U.S. Cl.
CPC ......... *H04B 1/3877* (2013.01); *H04B 1/3888* (2013.01)

(58) Field of Classification Search
CPC .......... F16M 13/00; F16M 11/38; G06F 1/16; A47B 23/002; A47B 23/02; H05K 5/0086; H05K 5/0204; H04B 1/3888
See application file for complete search history.

(56) References Cited

U.S. PATENT DOCUMENTS

| | | | |
|---|---|---|---|
| 5,209,452 A | 5/1993 | Goldberg | |
| 6,196,512 B1 | 3/2001 | Ure | |
| D455,755 S | 4/2002 | Levine et al. | |
| 7,185,869 B2 | 3/2007 | Smith | |
| D558,192 S | 12/2007 | Daly et al. | |
| D633,149 S | 2/2011 | Parshad | |
| 2004/0026590 A1* | 2/2004 | Lin | A47B 23/002 248/346.04 |
| 2006/0165230 A1 | 7/2006 | Parr | |
| 2015/0034781 A1* | 2/2015 | Kim | F16M 13/00 248/174 |
| 2015/0288406 A1* | 10/2015 | Haymond | H04B 1/3888 455/575.6 |

* cited by examiner

*Primary Examiner* — Nizar Sivji

(57) ABSTRACT

A cellular phone mounting assembly includes a panel that has a front side, a back side, an upper edge, a lower edge, a first side edge and a second side edge. A foot is attached to and extends forward of the lower edge. A shoulder is attached to and extends rearwardly from the upper edge to form an obtuse angle with the panel. A support is attached to and extends downwardly from the shoulder. A clip is removably attached to and extends rearwardly from the support. The clip engages an automobile console.

1 Claim, 5 Drawing Sheets

CELLULAR PHONE MOUNTING ASSEMBLY

BACKGROUND OF THE DISCLOSURE

Field of the Disclosure

The disclosure relates to personal electronic mounting devices and more particularly pertains to a new personal electronic mounting device for supporting a cellular phone at an angled orientation from a vehicle vent or other convenient location.

SUMMARY OF THE DISCLOSURE

An embodiment of the disclosure meets the needs presented above by generally comprising a panel that has a front side, a back side, an upper edge, a lower edge, a first side edge and a second side edge. A foot is attached to and extends forward of the lower edge. A shoulder is attached to and extends rearwardly from the upper edge to form an obtuse angle with the panel. A support is attached to and extends downwardly from the shoulder. A clip is removably attached to and extends rearwardly from the support. The clip is configured to engage an automobile console.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
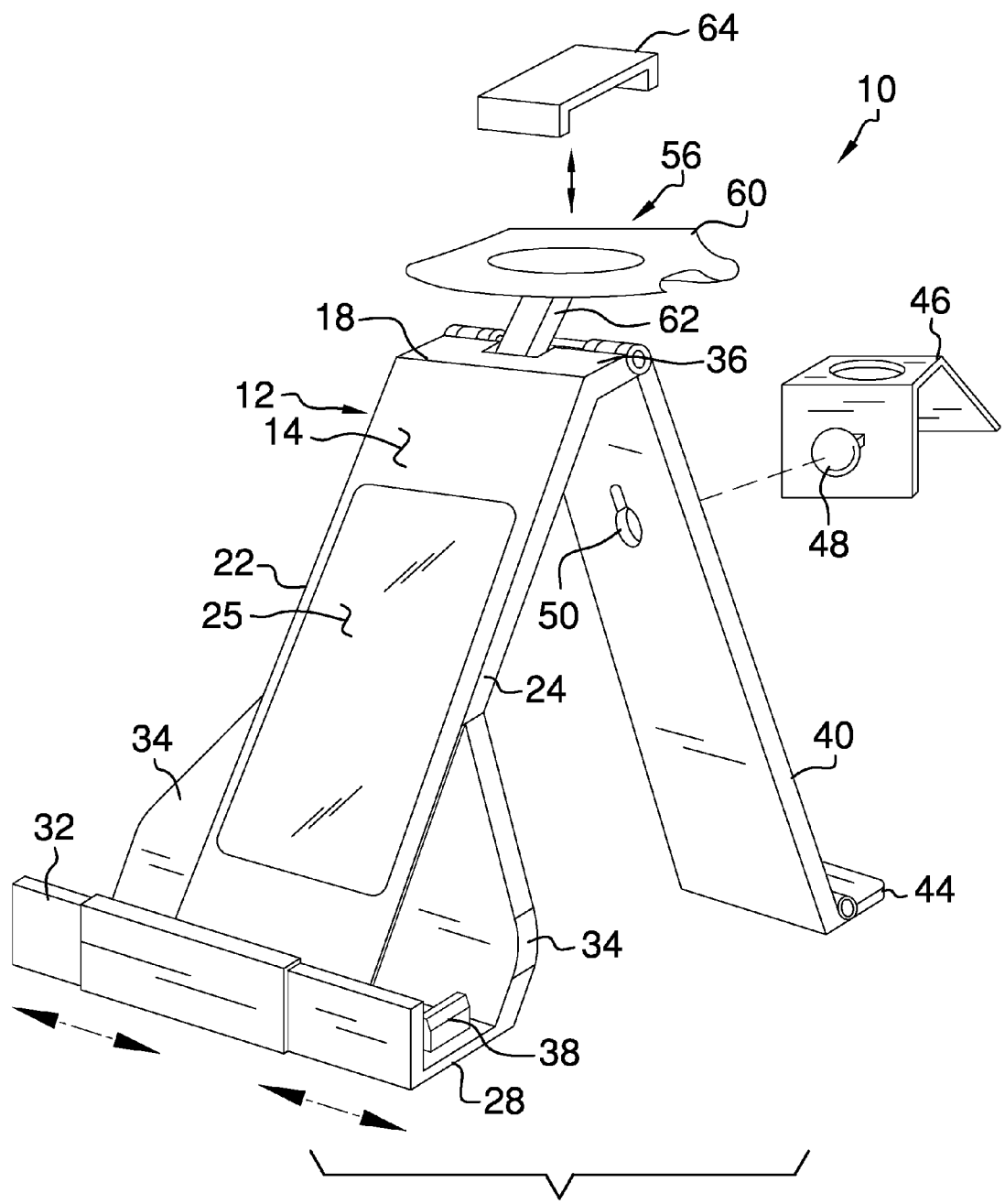
FIG. 1 is a front perspective view of a cellular phone mounting assembly according to an embodiment of the disclosure.
Figure 2:
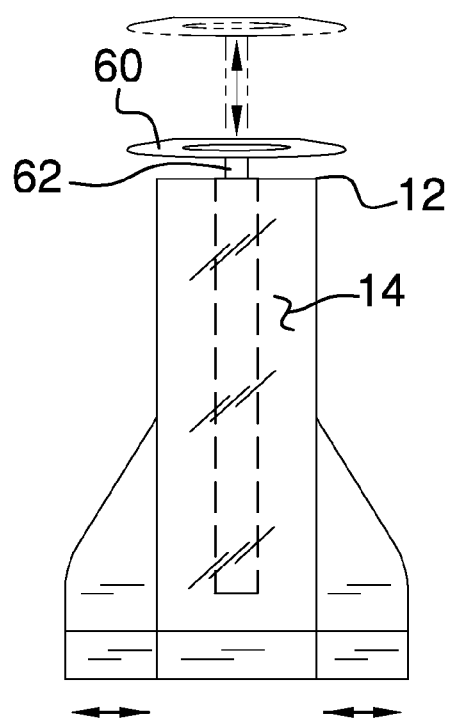
FIG. 2 is a front view of an embodiment of the disclosure.

With reference now to the drawings, and in particular to FIGS. 1 through 6 thereof, a new personal electronic mounting device embodying the principles and concepts of an embodiment of the disclosure and generally designated by the reference numeral 10 will be described.

As best illustrated in FIGS. 1 through 6, the cellular phone mounting assembly 10 generally comprises a panel 12 that has a front side 14, a back side 16, an upper edge 18, a lower edge 20, a first side edge 22 and a second side edge 24. The front side 14 may have a non-slip material positioned thereon such as an elastomeric material. The panel 12 has a height generally between 3.0 inches and 6.0 inches and a width generally between 2.0 inches and 4.0 inches. A non-slip material 25, such as an elastomer, may be positioned on the front side 14. A tripod mount 26 may be extended upwardly into the lower edge 20 of the panel 12. The tripod mount 26 is a threaded aperture configured to engage a conventional tripod threaded fastener.

A foot 28 is attached to and extends forward of the lower edge 20. An angle between the foot 28 and the front side 14 is an obtuse angle generally less than 130°. The foot 28 has a distal edge 30 with respect to the lower edge 20. A lip 32 is attached to and extends upwardly from the distal edge 30. An angle between the lip 32 and the foot 28 is less than or equal to 90°. As can be seen in FIG. 1, slidable wings 34 may be provided which are movable inwardly or outwardly of the panel 12, foot 28 and lip 32. A shoulder 36 is attached to and extends rearwardly from the upper edge 18 and forms an obtuse angle with back side 16 of the panel 12. Stops 38 may be positioned on the foot 28.

Figure 3:
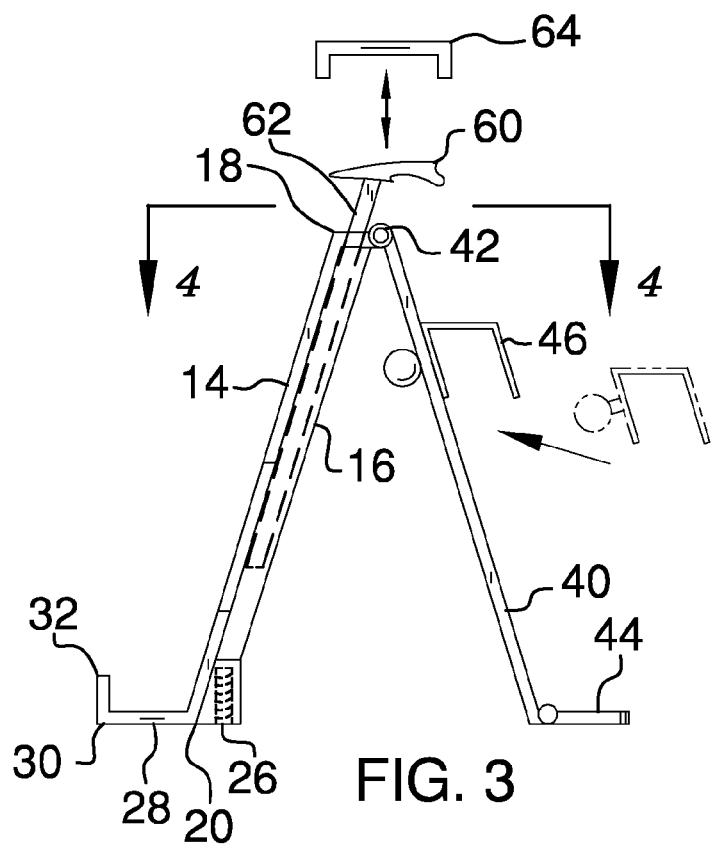
FIG. 3 is a side view of an embodiment of the disclosure.
Figure 4:
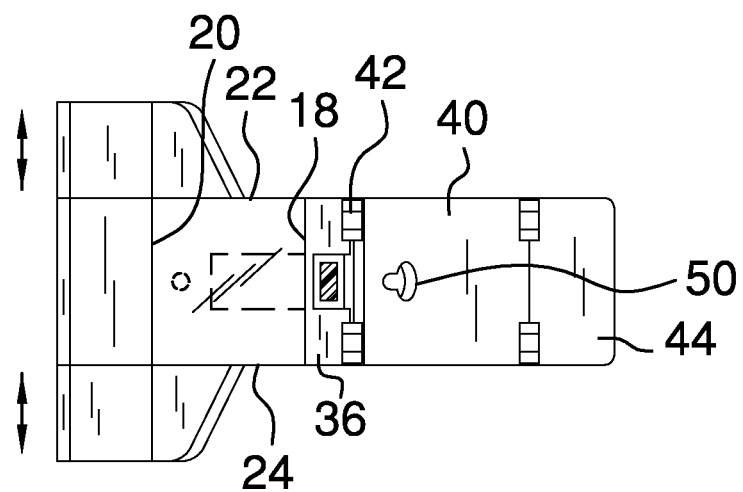
FIG. 4 is a cross-sectional view of an embodiment of the disclosure taken along line 4-4 of FIG. 3.
Figure 5:
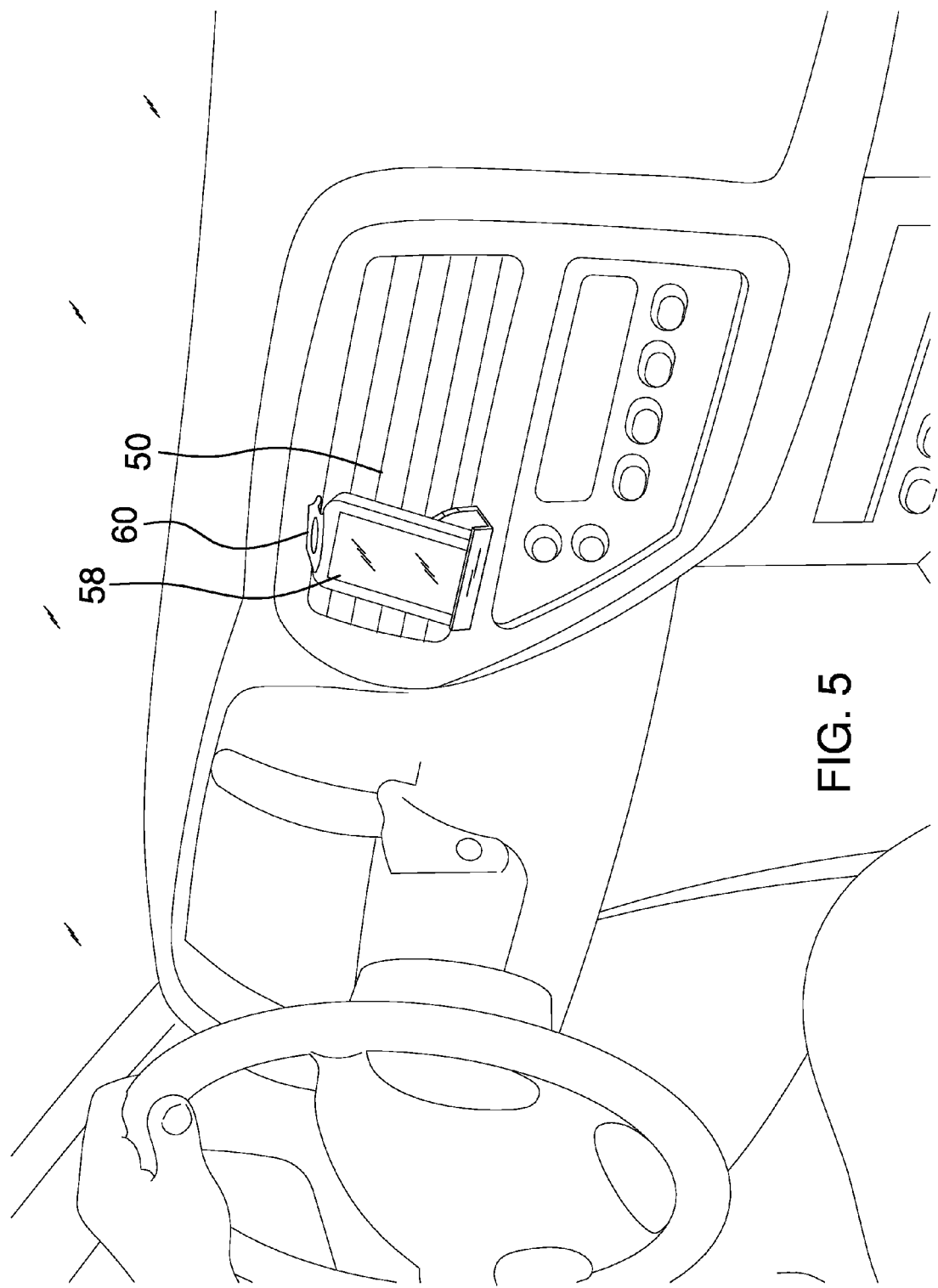
FIG. 5 is a perspective in-use view of an embodiment of the disclosure.
Figure 6:
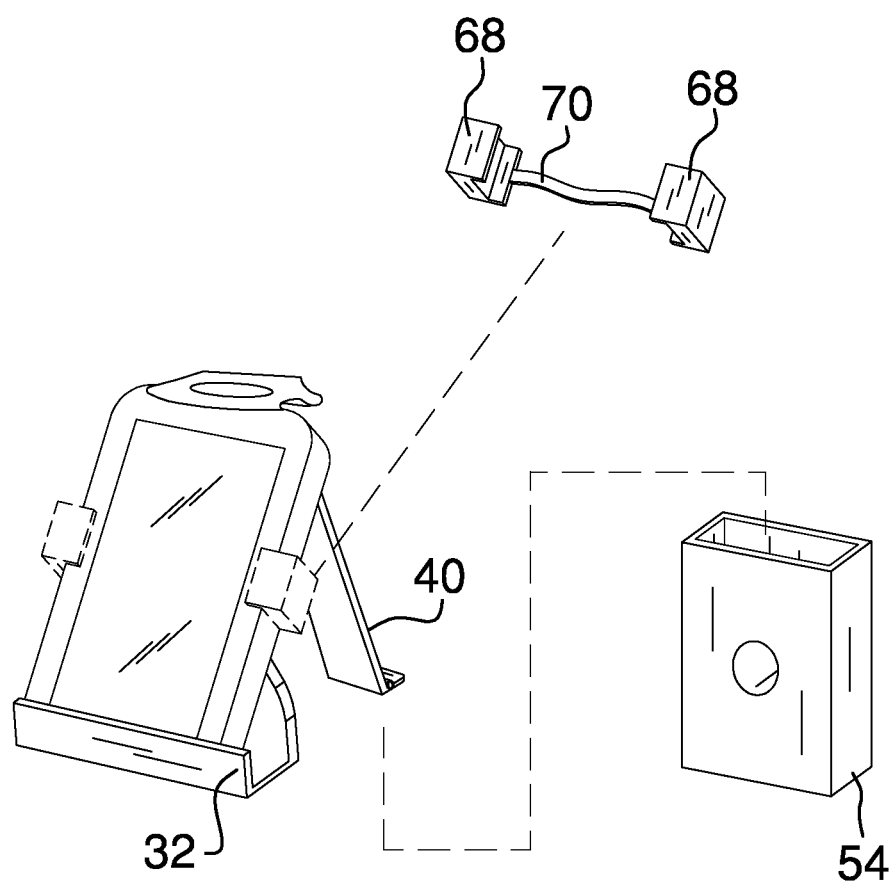
FIG. 6 is a perspective view of an embodiment of the disclosure.

A support 40 is attached to and extends downwardly from the shoulder 36. The support 40 is hingedly coupled to the shoulder 36 and is movable is a stored position forming an acute angle with the shoulder 36 or in a deployed position forming an angle with the shoulder 36 that is between 100° and 130° as shown in FIG. 3. The support 40 may be coupled to the shoulder 36 with a conventional locking hinge 42 retaining the support 40 at the deployed position. The support 40 may have a same height as the panel 12. A flange 44 may be attached to the support 40 distal to the shoulder and may be hingedly coupled to the support 40. The flange 44 helps support the assembly 10 in an upright position.

As can be seen in FIG. 3, a clip 46 may be removably attached to and extending rearwardly from the support 40. The clip 46 is configured to engage an automobile console such as the vent 52 of a vehicle or other element to which the clip 46 may be engaged. The clip 46 includes a connector 48 extendable through an aperture 50 in the support 40. Alternatively, a saddle 54 may be provided that is mountable to any wall by conventional means and which can receive the support 40 to mount the panel 12 to the saddle 54.

A retainer 56 is attached to the panel 12. The retainer 56 is configured to engage a cellular phone 58 when the cellular phone 58 is positioned on the foot 28. The retainer 58 includes a head 60 and a post 62 attached to the head 60. The post 62 slidably extends downwardly into the panel 12 through the upper edge 18 such that the head 60 is movable toward or away from the upper edge 18. The head 60 extends forward and is configured to be abutted against the cellular phone 58. Extensions 64 or other configurations of heads may be provided to alter the size of the head 60 or to bias the cellular phone 58 against the panel 12. Alternatively, or in addition to the above, a pair of catches 68 may be provided and attached to an elastic tether 70. The catches 68 are extended around the panel 12 and the cellular phone 58 on opposite sides thereof while the tether 70 pulls the catches 68 towards each other.

In use, the cellular phone 58, or other small, personal electronic device, is placed on the panel 12 as shown in the Figures and stated above. The assembly 10 is then either supported by the support or with the clip 46 so that the cellular phone 58 is positioned where the user can easily see and/or hear it.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cellular phone receiving and mounting assembly, said assembly being configured to retain the cellular phone at an angle, said assembly comprising:
   a panel having a front side, a back side, an upper edge, a lower edge, a first side edge and a second side edge;
   a foot being attached to and extending forward of said lower edge, an angle between said foot and said front side being an obtuse angle, said foot having a distal edge with respect to said lower edge, a lip being attached to and extending upwardly from said distal edge, an angle between said lip and said foot being less than or equal to 90°;
   a shoulder being attached to and extending rearwardly from said upper edge and forming an obtuse angle with said panel;
   a support being attached to and extending downwardly form said shoulder, said support being hingedly coupled to said shoulder and being movable being a stored position forming an acute angle with said shoulder or in a deployed position forming an angle with said shoulder being between 100° and 130°;
   a flange being attached to said support distal to said shoulder, said flange being hingedly coupled to said support;
   a clip being removably attached to and extending rearwardly from said support, said clip being configured to engage an automobile console;
   a retainer being attached to said panel, said retainer being configured to engage the cellular phone when the cellular phone is positioned on said foot, said retainer including a head and a post attached to said head, said post slidably extending downwardly into said panel through said upper edge, said head being movable toward or away from said upper edge, said head extending forward such that said head is configured to be abutted against the cellular phone; and
   a tripod mount extending upwardly into said lower edge of said panel.

* * * * *